(12) United States Patent
Stachnik et al.

(10) Patent No.: US 11,435,375 B2
(45) Date of Patent: Sep. 6, 2022

(54) METHOD OF DETERMINING AN UNCERTAINTY ESTIMATE OF AN ESTIMATED VELOCITY

(71) Applicant: Aptiv Technologies Limited, St. Michael (BB)

(72) Inventors: Mateusz Stachnik, Gdow (PL); Dariusz Cieslar, Kracow (PL)

(73) Assignee: Aptiv Technologies Limited, St. Michael (BB)

( * ) Notice: Subject to any disclaimer, the term of this patent is extended or adjusted under 35 U.S.C. 154(b) by 646 days.

(21) Appl. No.: 16/532,810

(22) Filed: Aug. 6, 2019

(65) Prior Publication Data
US 2020/0057090 A1     Feb. 20, 2020

(30) Foreign Application Priority Data
Aug. 16, 2018   (EP) ..................... 18189410

(51) Int. Cl.
*G06F 17/16* (2006.01)
*G01P 3/66* (2006.01)
*G06N 5/02* (2006.01)

(52) U.S. Cl.
CPC .............. *G01P 3/665* (2013.01); *G06F 17/16* (2013.01); *G06N 5/022* (2013.01)

(58) Field of Classification Search
CPC ................ G01P 3/665; G06N 5/022
See application file for complete search history.

(56) References Cited

U.S. PATENT DOCUMENTS

| | | | |
|---|---|---|---|
| 6,202,027 B1 | 3/2001 | Alland et al. | |
| 9,043,132 B2 | 5/2015 | Obi | |
| 9,187,091 B2 | 11/2015 | Mills | |
| 9,212,869 B1 * | 12/2015 | Boardman | G01S 13/66 |

(Continued)

FOREIGN PATENT DOCUMENTS

| | | |
|---|---|---|
| CN | 103183028 | 7/2013 |
| CN | 104290752 | 1/2015 |

(Continued)

OTHER PUBLICATIONS

"Final Office Action", U.S. Appl. No. 16/004,487, filed Nov. 3, 2021, 8 pages.

(Continued)

*Primary Examiner* — Loc Tran
(74) *Attorney, Agent, or Firm* — Sawtooth Patent Group PLLC

(57) ABSTRACT

A method of determining an uncertainty estimate of an estimated velocity of an object includes, determining the uncertainty with respect to a first estimated coefficient and a second estimated coefficient of the velocity profile equation of the object. The first estimated coefficient being assigned to a first spatial dimension of the estimated velocity and the second estimated coefficient being assigned to a second spatial dimension of the estimated velocity. The velocity profile equation represents the estimated velocity in dependence of the first estimated coefficient and the second estimated coefficient. The method also includes determining the uncertainty with respect to an angular velocity of the object, a first coordinate of the object in the second spatial dimension, and a second coordinate of the object in the first spatial dimension.

22 Claims, 3 Drawing Sheets

(56) References Cited

U.S. PATENT DOCUMENTS

| | | | |
|---|---|---|---|
| 9,390,624 | B2 | 7/2016 | Minemura et al. |
| 9,983,301 | B2 | 5/2018 | Liu et al. |
| 10,114,106 | B2 | 10/2018 | Schiffmann et al. |
| 10,634,766 | B2 | 4/2020 | Stachnik et al. |
| 11,125,872 | B2 | 9/2021 | Stachnik et al. |
| 2005/0075788 | A1 | 4/2005 | Smith et al. |
| 2005/0216146 | A1 | 9/2005 | Bauer et al. |
| 2010/0178934 | A1* | 7/2010 | Moeglein .............. G01S 5/0263 455/456.1 |
| 2011/0068970 | A1 | 3/2011 | Mitsumoto |
| 2011/0122014 | A1 | 5/2011 | Szajnowski |
| 2012/0242530 | A1 | 9/2012 | Luebbert et al. |
| 2013/0030686 | A1 | 1/2013 | Morotomi et al. |
| 2015/0054676 | A1 | 2/2015 | Vinski et al. |
| 2016/0202346 | A1 | 7/2016 | Anderson et al. |
| 2017/0206436 | A1 | 7/2017 | Schiffmann |
| 2017/0363727 | A1 | 12/2017 | Prasad et al. |
| 2017/0363728 | A1 | 12/2017 | Prasad et al. |
| 2018/0024228 | A1 | 1/2018 | Schiffmann et al. |
| 2018/0356498 | A1 | 12/2018 | Stachnik et al. |
| 2018/0356517 | A1 | 12/2018 | Cieslar et al. |
| 2019/0004166 | A1 | 1/2019 | Orlowski et al. |
| 2019/0361106 | A1 | 11/2019 | Stachnik et al. |
| 2019/0361113 | A1 | 11/2019 | Ray |
| 2019/0369228 | A1 | 12/2019 | Stachnik et al. |
| 2020/0182992 | A1 | 6/2020 | Kellner et al. |

FOREIGN PATENT DOCUMENTS

| | | |
|---|---|---|
| CN | 105842684 | 8/2016 |
| CN | 106372278 | 2/2017 |
| CN | 107209264 | 9/2017 |
| DE | 102013011239 | 1/2015 |
| DE | 102013018310 | 4/2015 |
| DE | 102013019804 | 5/2015 |
| EP | 2307908 | 1/2012 |
| EP | 3 285 230 A1 | 2/2018 |
| GB | 2504376 | 1/2014 |
| JP | 2015111332 | 6/2015 |
| KR | 20080007780 | 1/2008 |

OTHER PUBLICATIONS

"Extended European Search Report", EP Application No. 18189410.6, dated Nov. 27, 2018, 8 pages.
"Foreign Office Action", EP Application No. 18189410.6, dated Dec. 6, 2021, 4 pages.
"Extended European Search Report", EP Application No. 18175505.9, dated Nov. 27, 2018, 8 pages.
"Extended European Search Report", EP Application No. 17175548.1, dated Dec. 15, 2017, 9 pages.
"Final Office Action", U.S. Appl. No. 16/004,487, filed Oct. 21, 2020, 7 pages.
"Foreign Office Action", CN Application No. 201810586972.1, dated Nov. 4, 2020, 14 pages.
"Non-Final Office Action", U.S. Appl. No. 16/409,019, filed Feb. 16, 2021, 20 pages.
"Non-Final Office Action", U.S. Appl. No. 16/004,487, filed Mar. 17, 2020, 8 pages.
"Non-Final Office Action", U.S. Appl. No. 16/004,487, filed Feb. 3, 2021, 8 pages.
Brobeit, et al., "Fusion of Doppler Radar and Geometric Attributes for Motion Estimation of Extended Objects", Oct. 2015, 5 pages.
Fischler, et al., "Random Sample Consensus: A Paradigm for Model Fitting with Applications to Image Analysis and Automated Cartography", Jun. 1981, pp. 381-395.
Kellner, "Instantaneous Full-Motion Estimation of Arbitrary Objects using Dual Doppler Radar", Jun. 2014, 6 pages.
Kellner, et al., "Tracking of Extended Objects with High Resolution Doppler Radar", Dec. 2015, 13 pages.
Kmiotek, et al., "Representing and Tracking of Dynamics Objects Using Oriented Bounding Box and Extended Kalman Filter", Oct. 2008, pp. 322-328.
Roos, et al., "Estimation of the Orientation of Vehicles in High-Resolution Radar Images", Apr. 2015, 5 pages.
Roos, et al., "Reliable Orientation Estimation of Vehicles in High-Resolution Radar Images", Jul. 2016, 9 pages.
"Foreign Office Action", CN Application No. 201810586972.0, dated Jun. 11, 2021, 8 pages.
"Notice of Allowance", U.S. Appl. No. 16/386,691, filed Aug. 20, 2021, 7 pages.
Jung, et al., "Rectangle Detection Based on a Windowed Hough Transform", Jan. 2004, 8 pages.
Jung, et al., "Scanning Laser Radar-Based Target Position Designation for Parking Aid System", Sep. 2008, pp. 406-424.
Kellner, et al., "Instantaneous Lateral Velocity Estimation of a Vehicle using Doppler Radar", Jul. 2013, 9 pages.
Roos, et al., "Estimation of the Orientation of Vehicles in High-Resolution Radar Images", Apr. 2015, 4 pages.
Toussaint, "Solving Geometric Problems with the Rotating Calipers", May 1983, 8 pages.
"Foreign Office Action", EP Application No. 17175548.1, dated Jun. 7, 2021, 6 pages.
"Foreign Office Action", CN Application No. 201910747166.2, dated Jun. 9, 2021, 13 pages.
"Non-Final Office Action", U.S. Appl. No. 16/386,691, filed Apr. 16, 2021, 12 pages.
"Notice of Allowance", U.S. Appl. No. 16/409,019, filed Jun. 7, 2021, 10 pages.

\* cited by examiner

Determine detection points $(\theta_i, \dot{r}_i)$ and compensated range rate $(\dot{r}_{i,\text{cmp}})$ Determine first and second estimated coefficients of range rate equation $(\tilde{c}_t, \tilde{s}_t)$ Determine estimated velocity $(\hat{\dot{r}}_{i,\text{cmp}})$ Determine first portion of uncertainty estimate $(\widehat{U}^2_{VP})$ Determine second portion of uncertainty estimate $(\widehat{U}^2_{V_{i,\omega}})$ Determine uncertainty estimate on the basis of the first and second portion $(\widehat{U}^2_{V_{i,t}})$ Process estimated velocity in dependence of uncertainty estimate

Fig. 6

METHOD OF DETERMINING AN UNCERTAINTY ESTIMATE OF AN ESTIMATED VELOCITY

CROSS-REFERENCE TO RELATED APPLICATION

This application claims the benefit under 35 U.S.C. § 119(a) of European Patent Application EP 18189410.6, filed Aug. 16, 2018, the entire disclosure of which is hereby incorporated herein by reference.

TECHNICAL FIELD OF INVENTION

The invention relates to a method of determining an uncertainty estimate of an estimated velocity of an object, wherein the uncertainty estimate represents an uncertainty of the estimated velocity with respect to a true velocity of the object.

BACKGROUND OF INVENTION

Uncertainty estimates are useful for quantifying the validity of an estimated velocity. In other words, an uncertainty measure represents the extent to which an estimated velocity can be trusted, or the probability that the estimated velocity matches the true velocity. This is, the uncertainty can be interpreted as the range of potential error between the true and the estimated velocity. According to one definition the uncertainty represents a range of velocities wherein the true velocity is assumed to fall into the range. Accordingly, the uncertainty estimate is an estimate of this range.

SUMMARY OF THE INVENTION

In general, the higher the potential error between the estimated and the true velocity, the higher the uncertainty. Preferably, the uncertainty estimate is at least correlated to the uncertainty, which may manifest in that the uncertainty is proportional to the uncertainty estimate.

In modern automotive applications, in particular automated or autonomous driving applications, there is the need to exactly determine motion characteristics of any objects in the vicinity of a host vehicle. Such objects can be other vehicles but also pedestrians or stationary objects like traffic signs or walls. With the position and the motion characteristics of any objects in the vicinity of the host vehicle, it is possible to determine the environment of the vehicle in the sense of a general perception by means of sensor technology operably installed in the host vehicle. It is understood that the host vehicle (i.e., a control unit of the host vehicle) needs to have precise information about the velocities of surrounding objects in order to be able to securely control the vehicle by automatically generated driving commands. However, as indicated above, a totally precise estimation of the velocities of surrounding objects is usually not possible. In order to still allow secure automatic driving of the host vehicle, uncertainty estimates for each estimated velocity are of great help since the control unit of the host vehicle can readily adapt itself to the validity of the estimated velocities, thereby enabling optimum use of the available technical information.

An important motion characteristic is the velocity of a given object, which usually needs to be estimated by the host vehicle by means of sensors and is therefore subject to an estimation error, i.e. the estimated velocity deviates from the true velocity of the object. One way to determine an estimated velocity is by using one or more radar sensors installed in the host vehicle, wherein a plurality of detection points are determined with a radar system, each detection point representing an estimated velocity for a given location point in the vicinity of the host vehicle. A detection point can also be located on an object and can thus serve for estimating the velocity of the object. Preferably, a plurality of detection points on a single object are jointly evaluated in order to derive an estimated velocity which is more precise than the estimated velocity of a single detection point. An estimated velocity can comprise magnitude and direction, so that the estimated velocity is a vector with two components, i.e. quantifying the velocity with respect to two spatial dimensions. However, it is also possible that the estimated velocity only comprises a magnitude value.

Due to the inherent limitations of obtaining precise estimated velocities with modern sensor technology, in particular radar technology, there is the need to obtain knowledge about the potential error of an estimated velocity. In this regard, an uncertainty measure can be used for further processing of an estimated velocity, for example for a tracking algorithm configured to track the object so that the host vehicle has precise information about the motion of the particular object. This is to say that a given value of an estimated velocity is processed together with an uncertainty estimate. In this way, it can be ensured that the estimated velocity influences a given application in dependence of its validity. In more simple terms, an estimated velocity with a high uncertainty estimate should have less influence than another estimated velocity with a low uncertainty estimate.

There is the need for accurate uncertainty estimates (or measures) which quantify the true uncertainty of estimated velocities as best as possible, in particular when the object is rotating with an angular velocity that cannot or should not be estimated. In some applications, the variance of an estimated velocity can be used as an uncertainty estimate. However, it has been found that such an uncertainty estimate is not accurate in many motion situations which appear in real traffic scenarios. In particular, if a given object is not moving along a straight line (linear motion), variance is often a very bad uncertainty estimate. Furthermore, variance often shows a systematic error which badly influences any further processing of an estimated velocity, thus leading to a reduced performance of automated driving applications. This is not tolerable as the security for any traffic participants cannot be subject to a compromise.

A problem to be solved by the invention is to provide an improved method of determining an uncertainty estimate for an estimated velocity of an object. The problem is solved by the method according to claim 1.

A method of determining an uncertainty estimate of an estimated velocity of an object comprises the following steps: (a) determining a first portion of the uncertainty estimate, the first portion representing the uncertainty with respect to a first estimated coefficient and a second estimated coefficient of the velocity profile equation of the object, the first estimated coefficient being assigned to a first spatial dimension of the estimated velocity and the second estimated coefficient being assigned to a second spatial dimension of the estimated velocity. The velocity profile equation represents the estimated velocity in dependence of the first estimated coefficient and the second estimated coefficient;

(b) determining a second portion of the uncertainty estimate, the second portion representing the uncertainty with respect to an angular velocity of the object, a first coordinate of the object in the second spatial dimension and a second coordinate of the object in the first spatial dimension; and (c) determining the uncertainty estimate on the basis of the first portion and the second portion.

In summary, the uncertainty measure comprises or is composed of two dedicated portions. The first portion represents the uncertainty with respect to the two estimated "velocity" coefficients of the so called velocity profile equation, wherein the velocity profile equation is generally known from the art (cf. D. Kellner, M. Barjenbruch, K. Dietmayer, J. Klappstein, J. Dickmann, "Instantaneous lateral velocity estimation of a vehicle using Doppler radar," Information Fusion (FUSION), 2013 16th International Conference, Istanbul, 2013). This equation is also known as range rate equation and generally represents the estimated velocity in dependence of the two said coefficients. These coefficients are assigned to respective spatial dimensions, which means that the coefficients generally represent velocity components of an object in these dimensions. This interpretation is usually bound to a motion scenario in which the object is moving along a straight line (linear movement). However, if there is a rotational movement about a predefined axis of the object, i.e. the object has a yaw rate greater than zero, the coefficients do not fully represent "linear" velocity components but a mixture of rotational and linear velocity portions. Nevertheless, the coefficients are assigned to said dimensions because they are preferably used to evaluate the total velocity component in each dimension. The velocity profile equation is generally well known to the skilled person in the field of estimating motion of objects by means of sensor technology, in particular radar technology. The velocity profile equation is also discussed and explicitly provided further below.

The first and second estimated coefficient of the velocity profile equation are estimated figures and contribute to the overall uncertainty of the estimated velocity. Said first portion of the uncertainty measure can thus be interpreted to capture the uncertainty information that is connected to the coefficients.

The second portion of the uncertainty estimate is connected to the angular velocity of the object. In particular, the angular velocity is a yaw rate of the object, i.e., a rotational velocity of the object in a horizontal plane about a predefined axis which extends orthogonally to said plane. For example, the yaw rate of a car (one type of object) generally corresponds to a lateral movement of the car caused by steering activities of the driver while travelling.

An estimation of the angular velocity usually delivers insufficient results when using only one scan (i.e. one measurement instance) of one sensor. This is to say that the estimated angular velocity is in most cases not plausible. The estimation can be improved by filtering signals over time or by using two sensors (cf. D. Kellner, M. Barjenbruch, J. Klappstein, J. Dickmann, and K. Dietmayer, "Instantaneous full-motion estimation of arbitrary objects using dual doppler radar," in Proceedings of Intelligent Vehicles Symposium (IV), Dearborn, Mich., USA, 2014). However, this solution requires multiple sensors for covering the field of view and leads to a significant increase of the overall costs.

The angular velocity of the object contributes to the overall uncertainty of the estimated velocity of the object (independent from a potential estimation of the angular velocity). It can be shown that in general terms a mathematical connection exists between the estimated velocity, the first and second coefficients, and the angular velocity. This connection can be expressed by a first coordinate of the object in the second spatial dimension and a second coordinate of the object in the first spatial dimension. The first and second coordinates are related to or represent a point which corresponds to a location on the object for which the estimated velocity is assumed to be valid. However, the coordinates are inverted between the dimensions, which is due to mathematical reasons, as will become apparent in further detail below. The proposed uncertainty estimate takes these coordinates into account, which leads to a more accurate uncertainty estimate in view this local definition of the second portion.

The final uncertainty estimate is formed on the basis of the first and second portion of the uncertainty estimate. The split-up of the uncertainty estimate into two portions has been found to lead to a higher accuracy of the overall estimate. In particular, treating the angular velocity separately from the coefficients of the range rate equation is one aspect that improves the reliability of the proposed uncertainty estimate.

Advantageous embodiments of the invention are specified in the dependent claims, the description and the drawings.

According to one embodiment the uncertainty estimate represents a dispersion of the estimated velocity. Likewise, the first portion of the uncertainty estimate represents a dispersion of the first estimated coefficient and the second estimated coefficient. Furthermore, the second portion can represent a dispersion of the angular velocity of the object. The term "dispersion" is understood as a spread in the sense that it indicates a range of possible values. Known types of dispersion are variance and standard deviation, also the term dispersion is not restricted accordingly. These types represent a dispersion of values around a mean. The advantage of expressing the uncertainty measure or parts of it in terms of a dispersion is an intuitive understanding of the estimate, which is known in the field of statistics. For example a high dispersion may represent a high uncertainty.

According to another embodiment the uncertainty estimate and/or the first portion and/or the second portion of the uncertainty estimate are determined as a two-dimensional matrix, wherein the two-dimensional matrix represents a dispersion with respect to the first spatial dimension and the second spatial dimension. In particular, each of the portions and the resulting uncertainty estimate can be determined, i.e. expressed as a two-dimensional matrix. The use of matrices is advantageous in view of an efficient processing of a given estimated velocity for which the uncertainty estimate should be valid. Furthermore, a direct correspondence between the two spatial dimensions and the two dimensions of the matrix can be implemented.

According to another embodiment the first portion is determined on the basis of:
  a covariance portion representing a covariance matrix of the first estimated coefficient and the second estimated coefficient; and
  a bias portion representing a bias of the first estimated coefficient and/or the second estimated coefficient.

For example the first portion of the uncertainty measure can be determined as the sum of the covariance portion and the bias portion. However, other types of combination are also possible.

Said covariance portion can be determined as the covariance matrix of the first and second estimated coefficients, wherein the covariance matrix includes the variances of the coefficients and the covariances between them. This structure of a covariance matrix is known from the field of statistics and it can be calculated with high efficiency. It has proven robust and it enhances the accuracy of the uncertainty estimate in combination with other portions.

The term "bias" is generally interpreted as a systematical statistical error. For example, the bias can be a constant representing an average difference between an estimated mean and a true mean of values. The covariance portion can be centered around an estimated mean, wherein the bias can indicate how far the estimated mean is away from the true mean. Therefore, the bias portion can be interpreted as a correction portion with respect to a systematical error in the covariance portion or another (sub-) portion of the first portion.

It is important to point out that the bias (or estimated bias) is not used to correct the estimated velocity but rather to improve the uncertainty estimation so as to make it more consistent. The bias is estimated so as to improve the validity of the estimated uncertainty (not the estimated velocity). A precise knowledge of the bias is not necessary and in some cases cannot even be estimated due to a lack of observability. This lack can be handled by introducing the bias portion. A similar approach could also be used to determine the uncertainty of the angular velocity.

Having further regard to the bias portion, according to one embodiment, the bias portion can be determined on the basis of a plurality of detection points of the object and at least one constant, wherein each of the plurality of detection points comprises an estimated velocity at a detection position on the object, said detection position on the object being defined at least by an angle. The detection points can be acquired by means of a radar system as pointed out further above, however, other sensor technology is also possible. The detection points are preferably acquired in one time instance, i.e. the plurality of detection points only comprise detection points from one scan, in particular a radar scan of a radar system.

The plurality of detection points allows to adapt the bias portion in dependence of actual sensor data, which significantly improves the accuracy of the uncertainty estimate. In particular, the bias portion can use the same data as used for determining the first and second coefficients of the velocity profile equation, i.e. the data from the detection points is used for determining the coefficients of the velocity profile equation an the bias portion.

The estimated velocity (for which the uncertainty estimate is determined) can be assigned to a position of the object. This position is preferably represented by the first coordinate of the object in the first spatial dimension and the second coordinate of the object in the second spatial dimension and wherein the uncertainty estimate is determined in dependence of said position of the object. Assigning the uncertainty to a particular position on or of the object improves the accuracy of the uncertainty measure because its "maximum local validity" is explicitly taken into account so that subsequent processing of the estimated velocity can benefit from this information. "Lossy averaging", which could be done in order to provide one single uncertainty estimate for a large object can be avoided.

The estimated velocity (for which the uncertainty estimate is determined) can be equal to the velocity of the velocity profile equation, i.e. the estimated velocity can directly depend on the first and second estimated coefficient. However, the estimated velocity can also be determined in other way, for example by using other sensor technology.

In the following, embodiments with regard to determining the second portion will be addressed.

According to one embodiment the second portion is determined on the basis of an intermediate second portion. The intermediate second portion represents the uncertainty with respect to the angular velocity only, wherein the intermediate second portion is predetermined. In other words, the intermediate second portion only represents the "angular velocity uncertainty", e.g. a range of values which is assumed to include or cover the true unknown angular velocity. In this approach, the intermediate second portion is predetermined, i.e. is set to one or more predefined values. It has been found that better results can be achieved with a predetermined intermediate second portion, rather than trying to determine the intermediate second portion on the basis of real estimates of the angular velocity. Angular velocity is difficult to estimate with high precision, in particular when the angular velocity should be estimated from only one scan ("single processing instance"). The estimation also remains to be difficult when multiple sensors are used to observe one single object (cf. D. Kellner, M. Barjenbruch, J. Klappstein, J. Dickmann, and K. Dietmayer, "Instantaneous full-motion estimation of arbitrary objects using dual doppler radar," in Proceedings of Intelligent Vehicles Symposium (IV), Dearborn, Mich., USA, 2014). When only one sensor is used for observing an object estimation of the angular velocity (i.e. yaw rate) of the object is extremely difficult, in most cases the estimated angular velocity cannot even be treated as roughly plausible. In this context, the proposed uncertainty measure can provide significant advantages because an estimation of the angular velocity can be completely avoided.

Relying on a predetermined intermediate second portion can even lead to much more accurate results because it has been recognized that angular velocity is usually bounded to certain limits for most object classes. For example in a traffic scenario, it can be assumed that the angular velocity of any object will usually be below a certain threshold.

In a preferred embodiment, the intermediate second portion is predetermined by the variance of a distribution of the angular velocity of the object. This is an approach for modelling the angular velocity by means of an assumed distribution. The variance or related figures can be picked as a key figure because it is well suited to represent a range or dispersion of values, which is line with the general mindset of the uncertainty estimate. It is possible that the intermediate second portion is equal to a predetermined variance of the angular velocity of the object.

In a specific embodiment, said distribution is a uniform distribution with at least one predetermined extremum of the angular velocity of the object. Therefore, it is possible to make an explicit model assumption via a distribution. Other model distributions for the angular velocity are also possible, for example triangular or trapezoidal distributions.

In another embodiment, the intermediate second portion is predetermined by at least one parameter representing an extremum of the angular velocity of the object. For example, a maximum value for the angular velocity can be manually set and used for parameterizing the intermediate second portion. This can be done, e.g., by determining the second intermediate portion as the variance of a model distribution of the angular velocity, wherein the model distribution is limited to angular velocities between the negative maximum angular velocity (negative extremum) and the positive maximum angular velocity (positive extremum). As pointed out before, a uniform distribution may be chosen as a model distribution, but other model distributions are also possible. This may depend on the particular application. It is also possible to choose the model distribution in dependence of an object type. For example, if the object is automatically classified as a passenger car a different distribution may be chosen than if the object is classified as a lorry. Likewise, different extrema may be chosen for the intermediate second portions. So in general terms, determination of the uncertainty estimate may depend on a class of the object, wherein the class can be determined automatically by using a classification method. Such a classification method may be based on visual data of the object acquired by means of a camera but may also be based on the estimated velocity of the object.

In yet another embodiment, the uncertainty estimate can be determined on the basis of a sum of the first portion and the second portion. Other mathematical combinations are also possible, for example a quotient between the first portion and the second portion of the uncertainty estimate.

Having regard to possible uses of the uncertainty estimate the method can further comprise controlling a vehicle in the vicinity of the object in dependence of the estimated velocity of the object, wherein the estimated velocity is processed in dependence of the uncertainty estimate.

The invention also relates to a storage device with software, in particular firmware, for carrying out method the method according to one of the preceding embodiments.

The storage device can be part of a system comprising the storage device and a vehicle, wherein the vehicle comprises a sensor and a control unit configured to cooperate with the storage device. The control unit is further configured to determine a plurality of detection points of at least one object in the vicinity of the sensor, each detection point comprising an estimated velocity at a position on or near the object. Moreover, the control unit is configured to determine an uncertainty estimate of the estimated velocity for at least one of the detection points by using the software stored in the storage device.

In an embodiment of the system the control unit can be further configured to track the object on the basis of the uncertainty estimate and/or to classify the object on the basis of the uncertainty estimate. It is also possible to discriminate the object from other objects on the basis of the uncertainty estimate. Other applications, in particular automotive application, in which estimated velocities of objects other than the (host) vehicle are employed, can also be modified such that the uncertainty estimate is taken into account. The reliability and accuracy of such applications can thus be improved. Examples of such applications are distance control, valet parking and autonomous driving.

According to another embodiment of the system the sensor and the control unit can form a so called Pulse-Doppler radar system, which is a widespread and well-known system for determining a plurality of detection points, each detection point representing an estimated velocity at a position on the object, and the position being defined at least by an angle $\theta_i$. The angle is often an azimuth angle as it represents an angle about a boresight of a radar antenna of the system, wherein the angle is in a horizontal plane, which corresponds to a ground beneath the vehicle.

As a general aspect of the disclosure and according to an embodiment of the method the first estimated coefficient and the second estimated coefficient are determined on the basis of a plurality of detection points, each detection point representing an estimated velocity at a position on the object, the position being defined at least by an angle $\theta_i$, wherein the velocity profile equation is represented by:

$$\dot{r}_{i,cmp} = [\cos\theta_i \quad \sin\theta_i ] \begin{bmatrix} \tilde{c}_t \\ \tilde{s}_t \end{bmatrix},$$

wherein $\dot{r}_{i,cmp}$ represents the velocity of the object at the position of the i-th detection point, $\tilde{c}_t$ denotes the first estimated coefficient, $\tilde{s}_t$ denotes the second estimated coefficient, and $\theta_i$ denotes the position of the i-th detection point. The plurality of detection points are preferably acquired in one time instance, i.e. the plurality of detection points only comprise detection points from one scan, in particular a radar scan of a radar system.

A radar system, in particular said Pulse-Doppler radar system is well suited to provide a plurality of detection points on which basis said velocity profile equation can readily be determined. The proposed uncertainty estimate is particularly suitable to accurately represent the uncertainty of estimated velocities determined by using the velocity profile equation.

It is understood that in connection with mathematical expressions disclosed herein that mathematical expressions do not necessarily need to be exactly fulfilled in a strict mathematical sense. In particular, an algebraic expression can be understood in a conceptual sense. This is to say that an equal sign can still be satisfied if the equality is only approximately fulfilled. Therefore, if the expression is implemented on a computer machine any numerical deviations from the narrow meaning of the expression (i.e., offsets or essentially constant factors) which are merely due to technical details of the implementation do not influence the fact that the implementation falls under the meaning of the expression, as is understood by those skilled in the art. In particular, any equality sign (i.e., "=") that appear in any of the algebraic expressions disclosed herein may be substituted by a proportionality sign (i.e., "~").

BRIEF DESCRIPTION OF DRAWINGS

The invention is further described by way of example with reference to the drawings in which:

FIG. 6 illustrates an embodiment of the method as described herein.

DETAILED DESCRIPTION

Figure 1:
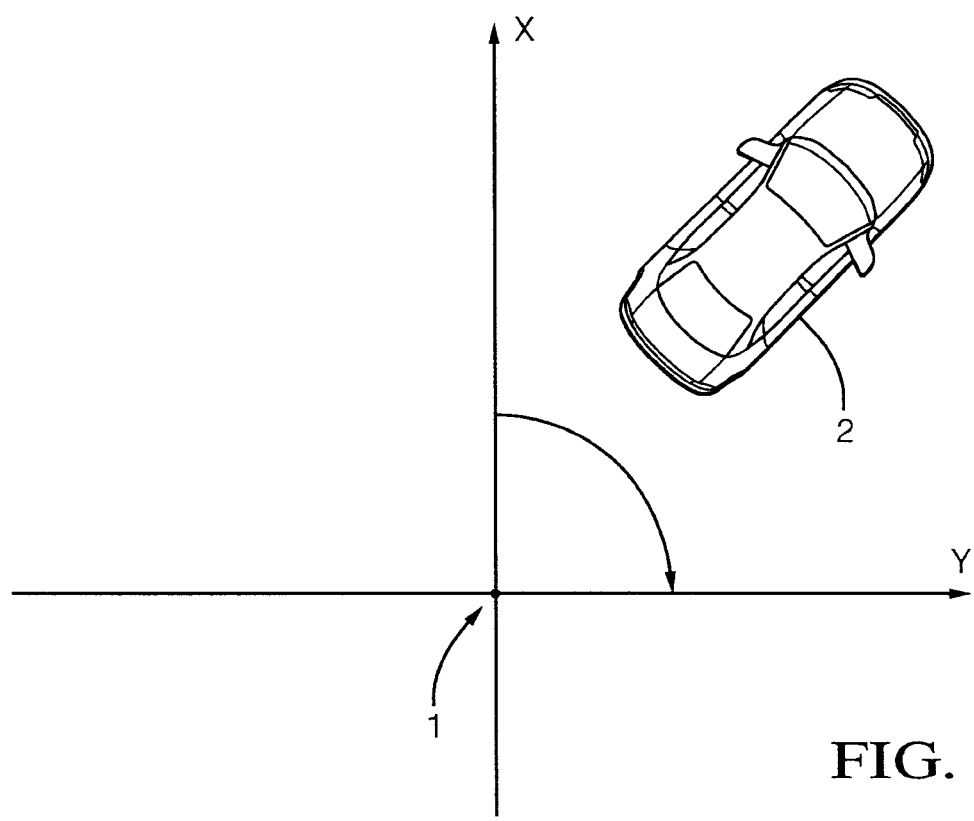
FIG. 1 shows a target coordinate system.

Generally, a host vehicle 4 (see FIG. 2) is equipped with a radar system 5' (see FIG. 2) where reflected radar signals from a target 2 (FIG. 1) in the field of view of the radar system 5' are processed to provide data in order to ascertain parameters used in the methodology.

In order to do this various conditions and requirements may be of advantage. The target 2 (rigid body, e.g. vehicle) is preferably an extended target, i.e., the target allows the determination of a plurality of points of reflection 6' (see FIG. 4) that are reflected from the target 2 in real-time and that are based on raw radar detection measurements.

The target 2 is an example of an object in the sense of the general part of the description and the claims. However, other types of objects are also possible, in particular objects that appear in ordinary traffic scenes, like motorcycles, bicycles, pedestrians, large as well as small vehicles. Moreover, in principal objects can also be stationary objects.

As used herein, the term "extended target" is used to refer to targets 2 that are capable of providing multiple, i.e. two, three or more spaced-apart scattering-points 6' also known as points of reflection 6'. The term "extended target" is thus understood as a target 2 that has some physical size. In this instance, it should be noted that the physical size can be selected, e.g., in the range of 0.3 m to 20 m in order to be able to detect points of reflection 6' stemming from, e.g., a moving person to a moving heavy goods vehicle or the like.

The various scattering points 6' are not necessarily individually tracked from one radar scan to the next and the number of scattering points 6' can be a different between scans. Furthermore, the locations of the scattering points 6' can be different on the extended target 2 in successive radar scans.

Radar points of reflection 6' can be determined by the host vehicle 4 from radar signals reflected from the target 2, wherein a comparison of a given reflected signal with an associated emitted radar signal can be carried out to determine the position of the radar point of reflection 6', e.g., in Cartesian or Polar coordinates (azimuth angle, radial range) with respect to the position of a radar-emitting and/or radar-receiving element/unit on the host vehicle, which can be the position of the radar sensor unit.

By using, e.g., Doppler radar techniques, the range rate is also determined as known in the art. It is to be noted that the "raw data" from a single radar scan can provide the parameters $\theta_i$ (azimuth angle) and $\dot{r}_i$ (raw range rate, i.e., radial velocity) for the i-th point of reflection of n points of reflection. These are the parameters which are used to estimate the velocity of a (moving) target, wherein i=1, . . . , n.

It is also to be noted that the term instantaneous radar scan, single radar scan or single measurement instance can include reflection data from a "chirp" in Doppler techniques, which may scan over, e.g., up to 2 ms. This is well known in the art. In the subsequent description, the following conventions and definitions are used:

World Coordinate System

As a convention, a world coordinate system with the origin fixed to a point in space is used it is assumed that this world coordinate system does not move and does not rotate. Conventionally, the coordinate system is right-handed; the Y-axis, orthogonal to the X-axis, pointing to the right; the Z-axis pointing into the page and a an azimuth angle is defined in negative direction (clock-wise) with respect to the X-axis; see FIG. 1 which shows such a coordinate system with origin 1 and a non-ego vehicle target 2. FIG. 1 further shows the extended target 2 in the form of a vehicle, e.g. an object having a length of approximately 4.5 m.

Vehicle Coordinate System

Figure 2:
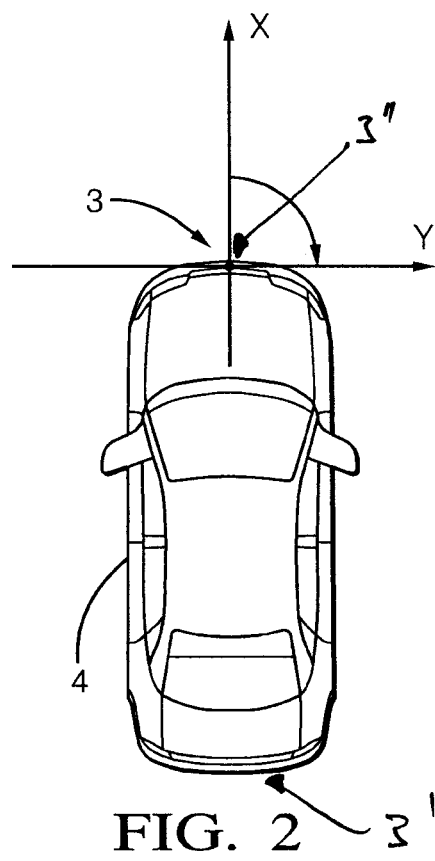
FIG. 2 shows a vehicle coordinate system.

FIG. 2 shows a vehicle coordinate system that in the present instance has its origin 3" located at the center of the front bumper 3 of a host vehicle 4. It should be noted in this connection that the origin 3" of the vehicle coordinate system can be arranged at different positions at the host vehicle 4.

In the present instance the X-axis is parallel to the longitudinal axis of the host vehicle 4, i.e. it extends between the front bumper 3 and a rear bumper 3' and intersects with the center of the front bumper 3 if the origin 3" is located there. The vehicle coordinate system is right-handed with the Y-axis orthogonal to the X-axis and pointing to the right, the Z-axis pointing into the page. An (azimuth) angle is defined as in the world coordinate system.

Sensor Coordinate System

Figure 3:
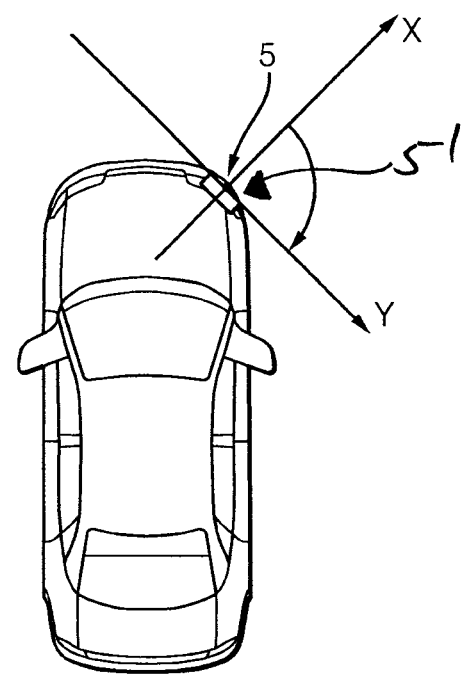
FIG. 3 shows a sensor coordinate system.

FIG. 3 shows a sensor coordinate system having the origin 5. In the example of FIG. 3 the origin 5 is located at the center of a radar system (in particular sensor unit) 5', which can be a radome. The X-axis is perpendicular to the sensor radome, pointing away from the radome. The coordinate system is right-handed: Y-axis orthogonal to the X-axis and pointing to the right; Z-axis pointing into the page. An (azimuth) angle is defined as in the world coordinate system.

The velocity and the yaw rate of the host vehicle 4 are assumed to be known from sensor measurements known in the art. The over-the-ground (OTG) velocity vector of the host vehicle 4 is defined as:

$$V_h = [u_h v_h]^T,$$

where $u_h$ is the longitudinal velocity of the host vehicle 4 (i.e., the velocity in a direction parallel to the X-axis of the vehicle coordinate system) and $v_h$ is lateral velocity of the host vehicle 4 (i.e., the velocity in a direction parallel to the Y-axis of the vehicle coordinate system). In more general terms, the longitudinal velocity and the lateral velocity are a first and a second velocity component of the host vehicle 4, respectively. The X-axis and the Y-axis generally correspond to a first spatial dimension and a second spatial dimension, respectively. Likewise, the longitudinal direction and the lateral direction correspond to the first spatial dimension and the second spatial dimension, respectively. These are preferably but not necessarily in orthogonal relation to each other.

The sensor mounting position and boresight angle with respect to the vehicle coordinate system are assumed to be known with respect to the vehicle coordinate system (VCS), wherein the following notations are used:

$x_{s,VCS}$—sensor mounting position with respect to longitudinal (X-) coordinate $y_{s,VCS}$—sensor mounting position with respect to lateral (Y) coordinate $y_{s,VCS}$—sensor boresight angle.

The sensor over-the-ground (OTG) velocities can be determined from the known host vehicle velocity and the known sensor mounting position. It is understood that more than one sensor can be integrated into one vehicle and specified accordingly.

The sensor OTG velocity vector is defined as:

$$V_s = [u_s v_s]^T,$$

wherein $u_s$ is the sensor longitudinal velocity and $v_s$ is the sensor lateral velocity corresponding generally to first and second velocity components in the case of a yaw rate of zero.

At each radar measurement instance (scan) the radar sensor unit captures n (raw) detection points from the target. Each detection point i=1, . . . , n can be described by the following parameters expressed in the sensor coordinate system:

$r_i$—range (or radial distance), $\theta_i$—azimuth angle, $\dot{r}_i$—raw range rate (or radial velocity).

Target planar motion can be described by the target OTG velocity vector at the location of each raw detection:

$$V_{t,i} = [u_{t,i} v_{t,i}]^T,$$

wherein $u_{t,i}$ represents the longitudinal velocity of the target at the location of the i-th detection point and $v_{t,i}$ represents the lateral velocity of the target at the location of the i-th detection point, both preferably but not necessarily with respect to the sensor coordinate system.

Target planar motion can be described as well by:

$$V_{t,COR} = [\omega_t x_{t,COR} y_{t,COR}]^T,$$

wherein $\omega_t$ represents the yaw rate (angular velocity) of the target, $x_{t,COR}$ the longitudinal coordinate of the center of target's rotation and $y_{t,COR}$ the lateral coordinate of the center of target's rotation.

Figure 4:
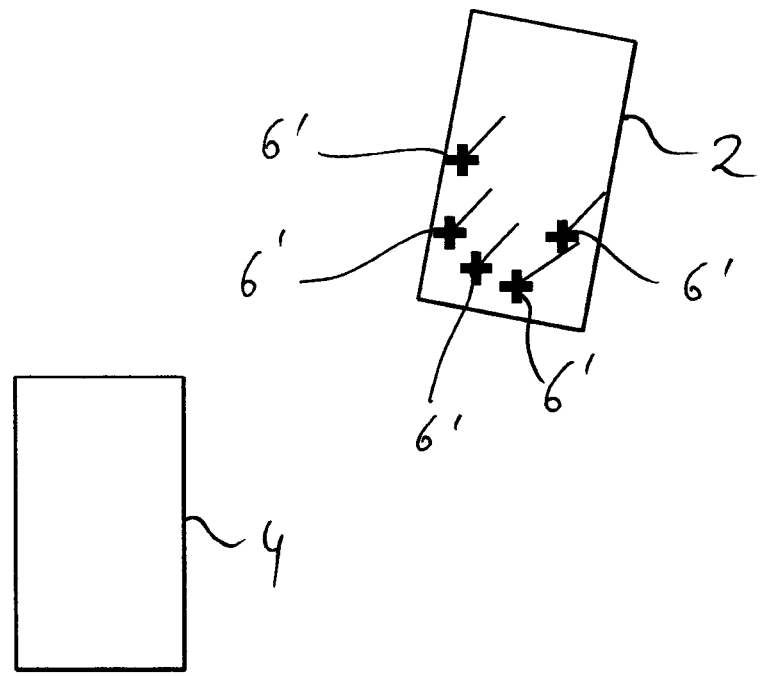
FIG. 4 shows a target vehicle with respect to a host vehicle with detection points located on the target vehicle.

FIG. 4 illustrates target velocity vectors as lines originating from a plurality of detection points 6' illustrated as crosses, wherein the detection points 6' are all located on the same rigid body target 2 and wherein the detection points 6' are acquired using a sensor unit of a host vehicle 4.

Figure 5:
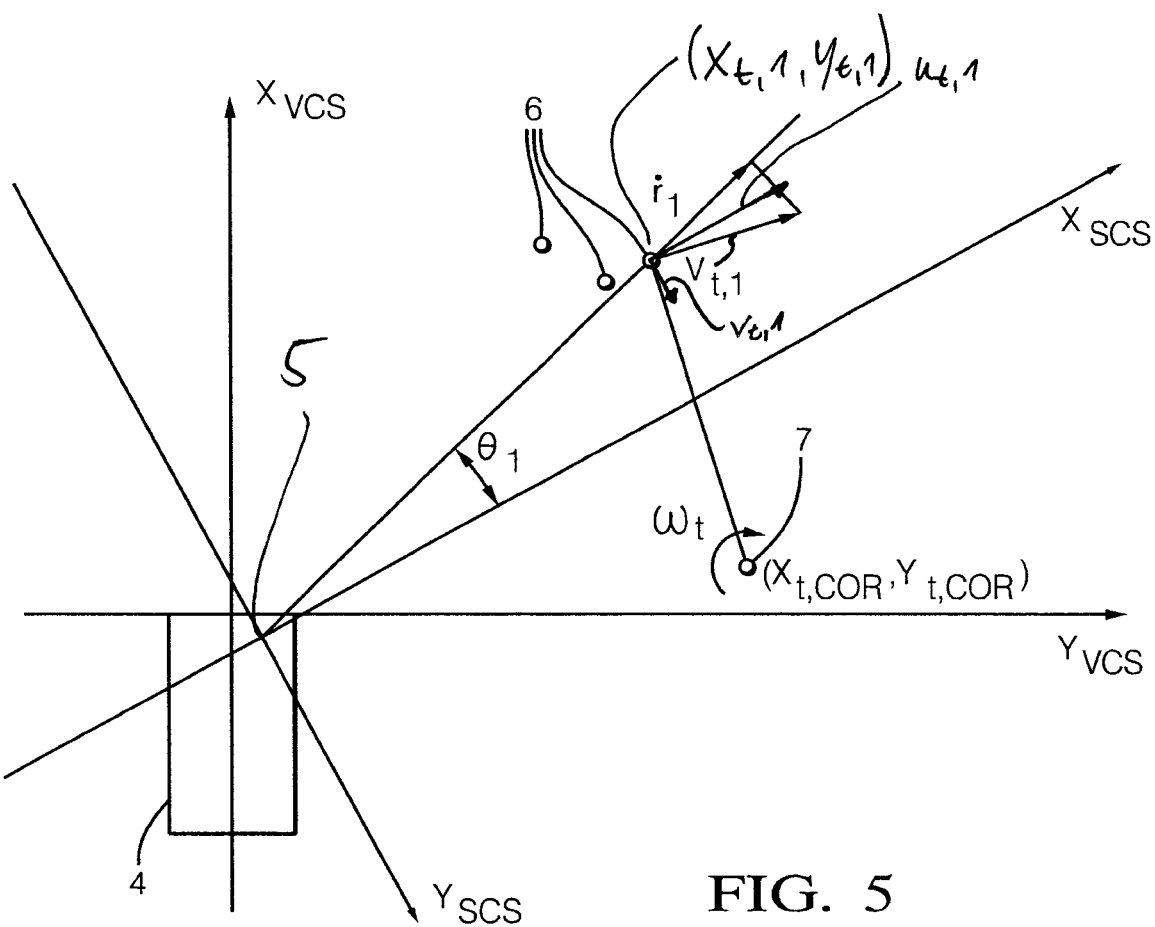
FIG. 5 illustrates how to calculate velocity vectors at the location of a detection point.

The general situation is shown in greater detail in FIG. 5 showing three detection points 6 located on a target (not shown) with a center of rotation 7. The vehicle coordinate system with axes $X_{VCS}$, $Y_{VCS}$ is shown in overlay with the sensor coordinate system having axes $X_{SCS}$, $Y_{SCS}$. The velocity vector of one of the detection points 6 (i=1) is shown together with its components $u_{t,i}$, $v_{t,i}$.

The range rate equation for a single detection point 6 can be expressed as follows:

$$\dot{r}_i + u_s \cos\theta_i + v_s \sin\theta_i = u_{t,i} \cos\theta_i + v_{t,i} \sin\theta_i,$$

wherein $\dot{r}_i$ represents the range rate, i.e., the rate of change of the distance between the origin of the sensor coordinate system and a detection point 6, as illustrated in FIG. 5. The location of the detection point 6 can be described by the azimuth angle $\theta_{i=1}$ and the value of the radial distance $r_{i=1}$ (range of detection point, i.e. distance between origin and the detection point).

To simplify the notation the compensated range rate can be defined as:

$$\dot{r}_{i,cmp} = \dot{r}_i + u_s \cos\theta_i + v_s \sin\theta_i$$

with $\dot{r}_{i,cmp}$ representing the range rate of the i-th detection point compensated for the velocity of the host vehicle 4.

The compensated range rate can also be expressed as:

$$\dot{r}_{i,cmp} = u_{t,i} \cos\theta_i + v_{t,i} \sin\theta_i.$$

The compensated range rate can also be expressed in vector notation as:

$$\dot{r}_{i,cmp} = [\cos\theta_i \quad \sin\theta_i] \begin{bmatrix} u_{t,i} \\ v_{t,i} \end{bmatrix}.$$

The so called velocity profile equation (or range rate equation) is defined as:

$$\dot{r}_{i,cmp} = c_t \cos\theta_i + s_t \sin\theta_i,$$

wherein $c_t$ represents the first, e.g. longitudinal, coefficient or component of the range rate and $s_t$ represents the second, e.g. lateral, coefficient or component of the range rate equation. Note that the coefficients $c_t$, $s_t$ are preferably invariant with respect to the azimuth angle at least for a range of azimuth angles corresponding to the location of the target to which a plurality of detection points refer to and on which basis the coefficients have been determined. This means that the velocity profile equation is assumed to be valid not only for specific detection points but for a range of azimuth angles. Therefore, the range rate can readily be determined for any azimuth angle from a specific angle range using the range rate equation. The range rate is an example of an estimated velocity in the general sense of the disclosure.

As the skilled person understands, in practice, the "true" coefficients $c_t$, $s_t$ are usually estimated from a plurality of detection points. These estimates are denoted $\tilde{c}_t$ and $\tilde{s}_t$ and are estimated using, e.g., an iteratively (re-) weighted least squares methodology. In the following, an example method for estimating the coefficients $c_t$, $s_t$ is described.

Step 1: In an initial step, the method comprises emitting a radar signal and determining, from a plurality of radar detection measurements captured by said radar sensor unit, a plurality of radar detection points at one measurement instance. Each radar detection point comprises at least an azimuth angle $\theta_i$ and a range rate $\dot{r}_i$, wherein the range rate $\dot{r}_i$ represents the rate of change of the distance between the sensor unit and the target at the location of the i-the detection point (cf. FIG. 4). It is understood that the azimuth angle $\theta_i$ describes the angular position of the i-th detection point. It is assumed that the plurality of detection points are located on a single target (such target is usually referred to as a distributed target) as shown in FIG. 4. The target is an object.

Step 2: The compensated range rate $\dot{r}_{i,cmp}$ is determined as:

$$\dot{r}_{i,cmp} = \dot{r}_i + u_s \cos\theta_i + v_s \sin\theta_i,$$

wherein $u_s$ represents the first (e.g. longitudinal) velocity component of the sensor unit and wherein $v_s$ represents the second (e.g. lateral) velocity component of the sensor unit. The compensated range rate is the range rate compensated for the velocity of the host vehicle. Therefore, the compensated range rate can be interpreted as the effective velocity of the target at the location of the i-th detection point. The compensated range rate corresponds to an estimated velocity of the target.

Step 3: From the results of steps 1 and 2, an estimation $\tilde{c}_t$ of the first coefficient $c_t$ of the velocity profile equation of the target and an estimation $\tilde{s}_t$ of the second coefficient $s_t$ of the velocity profile equation of the target are preferably determined by using an iteratively reweighted least squares (IRLS) methodology (ordinary least squares would also be possible) comprising at least one iteration and applying weights $w_i$ to the radar detection points, wherein the velocity profile equation of the target is represented by:

$$\dot{r}_{i,cmp} = c_t \cos\theta_i + s_t \sin\theta_i.$$

The IRLS methodology is initialized, e.g., by the ordinary least squares (OLS) solution. This is done by first computing:

$$\begin{bmatrix} \tilde{c}_t \\ \tilde{s}_t \end{bmatrix} = [X^T X]^{-1} X^T \dot{r}_{cmp},$$

wherein $\dot{r}_{cmp}$ represents the vector of compensated range rates $\dot{r}_{i,cmp}$ for i=1, 2 ... n. Using $$\hat{\dot{r}}_{i,cmp} = \tilde{c}_t \cos\theta_i + \tilde{s}_t \sin\theta_i$$

an initial solution for $\hat{\dot{r}}_{i,cmp}$ is computed. Then, the initial residual is $$e_{\dot{r},i} = \dot{r}_{i,cmp} - \hat{\dot{r}}_{i,cmp}$$

is computed.

The variance of the residual is then computed as:

$$\hat{\sigma}_{\dot{r}}^2 = \frac{\sum_{i=1}^{n} (e_{\dot{r},i})^2}{n-2}.$$

Next, an estimation of the variance of the estimations $\tilde{c}_t$ and $\tilde{s}_t$ is computed:

$$\hat{\sigma}_{VP}^2 = \hat{\sigma}_{\dot{r}}^2 (X^T X)^{-1}.$$

wherein $$X = \begin{bmatrix} \cos\theta_1 & \sin\theta_1 \\ \vdots & \vdots \\ \cos\theta_n & \sin\theta_n \end{bmatrix}.$$

With the initial solution, weights $w_i \in [0; 1]$ can be computed in dependence of the residuals, wherein predefined thresholds may be used to ensure that the weights are well defined.

The weights $w_i$ are then arranged in a diagonal matrix $W$ and the estimation of the coefficients of the first iteration is given as:

$$\begin{bmatrix} \tilde{c}_t \\ \tilde{s}_t \end{bmatrix} = [X^T W X]^{-1} X^T W \dot{r}_{cmp}.$$

Step 4: From the solution of the first iteration an estimation $\hat{\dot{r}}_{i,cmp}$ of the velocity profile is determined represented by:

$$\hat{\dot{r}}_{i,cmp} = \tilde{c}_t \cos\theta_i + \tilde{s}_t \sin\theta_i,$$

wherein the azimuth angle $\theta_i$ is determined from step 1 and the estimation of the first and second coefficients $\hat{c}_t$ and $\hat{s}_t$ is determined from step 3 (initial solution). A new residual is computed as:

$$e_{\dot{r},i} = \dot{r}_{i,cmp} - \hat{\dot{r}}_{i,cmp}.$$

The variance of the new residual is then computed as:

$$\hat{\sigma}_{\dot{r}}^2 = \frac{\sum_{i=1}^{n}(\psi(e_{\dot{r},i}))^2}{\left(\sum_{i=1}^{n}\psi(e_{\dot{r},i})'\right)^2 (n-2)}$$

with $$\psi(e_{\dot{r},i}) = w_i e_{\dot{r},i},$$

wherein $\psi(e_{\dot{r},i})'$ represents the first derivative of $\psi(e_{\dot{r},i})$ with respect to the residual $e_{\dot{r},i}$, and wherein n represent the number of detection points.

Next, an estimation of the variance of the estimations $\tilde{c}_t$ and $\tilde{s}_t$ is computed as:

$$\hat{\sigma}_{VP}^2 = \hat{\sigma}_{\dot{r}}^2 (X^T X)^{-1},$$

wherein the variance may be compared to a stop criterion (e.g., a threshold) in order to decide whether or not a further iteration is carried out for determining the estimated coefficients $\tilde{c}_t$ and $\tilde{s}_t$. In this way, a final solution for the coefficients $\tilde{c}_t$ and $\tilde{s}_t$ can be obtained.

It can be shown that if the target 2 moves along a straight line (linear movement), the first and second estimated coefficients correspond to a portion of the velocity in the first and second spatial dimensions (i.e., x-direction and y-direction), respectively, this is:

$$V_{t,i}^x = \tilde{c}_t$$

$$V_{t,i}^y = \tilde{s}_t,$$

wherein $V_{t,i}^x$ is the velocity component in the x-direction for the i-th detection point and $V_{t,i}^y$ is the velocity component in the y-direction for the i-th detection point. In FIG. 5, these velocity components are indicated for one of the detection points 6, namely i=1, wherein $V_{t,i}^x = u_{t,i}$ and $V_{t,i}^y = v_{t,i}$.

In case the target has a non-zero yaw rate, i.e. $\omega_t$ is not zero, the velocity components with respect to the first and second spatial dimensions can be expressed as:

$$\begin{bmatrix} V_{t,i}^x \\ V_{t,i}^y \end{bmatrix} = \begin{bmatrix} (y_{t,COR} - y_{t,i})\omega_t \\ (x_{t,i} - x_{t,COR})\omega_t \end{bmatrix},$$

wherein $x_{t,i}$ is a first coordinate of the i-th detection point and $y_{t,i}$ is a second coordinate of the i-th detection point.

The range rate equation for each detection point can then be expressed as:

$$\dot{r}_{i,cmp} = (y_{t,COR} - y_{t,i})\omega_t \cos\theta_i + (x_{t,i} - x_{t,COR})\omega_t \sin\theta_i,$$

wherein this equation can be reduced to:

$$\dot{r}_{i,cmp} = (y_{t,COR})\omega_t \cos\theta_i + (-x_{t,COR})\omega_t \sin\theta_i,$$

because of $$y_{t,i} \cos\theta_i \sin\theta_i = r_{t,i} \sin\theta_i \cos\theta_i = x_{t,i} \sin\theta_i.$$

Recall that the range rate equation is generally defined as:

$$\dot{r}_{i,cmp} = [\cos\theta_i \quad \sin\theta_i] \begin{bmatrix} c_t \\ s_t \end{bmatrix}.$$

A comparison with the formulation of the range rate equation which includes the yaw rate shows that the estimated first and second coefficients can be expressed as $$\tilde{c}_t = (y_{t,COR})\omega_t$$

$$\tilde{s}_t = (-x_{t,COR})\omega_t,$$

respectively. Therefore, the velocity of the i-th detection point can be expressed as:

$$V_{t,i}^x = \tilde{c}_t + (-y_{t,i})\omega_t$$

$$V_{t,i}^y = \tilde{s}_t + (x_{t,i})\omega_t.$$

The yaw rate is usually unknown but may be estimated. Taking into account such an estimation, the estimated velocity at the i-th detection point can be expressed as:

$$\hat{V}_{i,t} = \begin{bmatrix} \hat{V}_{t,i}^x \\ \hat{V}_{t,i}^y \end{bmatrix} = \begin{bmatrix} \tilde{c}_t \\ \tilde{s}_t \end{bmatrix} + \begin{bmatrix} -y_{t,i} \\ x_{t,i} \end{bmatrix} [\hat{\omega}_t],$$

wherein the velocity portion with respect to the yaw rate can be identified as:

$$\hat{V}_{i,\omega} = \begin{bmatrix} -y_{t,i} \\ x_{t,i} \end{bmatrix} [\hat{\omega}_t],$$

with a second coordinate $-y_{t,i}$ in the first spatial dimension x and a first coordinate $x_{t,i}$ in the second spatial dimension y, i.e. the first and second coordinates define the position of the i-th detection point as $(x_{t,i}, y_{t,i})$ with the second coordinate being inverted.

In a more compact notation the estimated velocity at the i-th detection point can be expressed as:

$$\hat{V}_{i,t} = \overline{VP} + \hat{V}_{i,\omega},$$

wherein this estimated velocity can be set equal to the estimated compensated range rate of the velocity profile equation, as addressed further above.

The uncertainty estimate of the estimated velocity for the i-th detection point is preferably defined as:

$$\hat{U}_{V_{i,t}}^2 = \hat{U}_{VP}^2 + \hat{U}_{V_{i,\omega}}^2,$$

wherein $\hat{U}_{V_{i,t}}^2$ is a two-dimensional matrix, $\hat{U}_{VP}^2$ is a two-dimensional matrix and a first portion of the uncertainty estimate $\hat{U}_{V_{i,t}}^2$, and $\hat{U}_{V_{i,\omega}}^2$ is a two-dimensional matrix and a second portion of the uncertainty estimate $\hat{U}_{V_{i,t}}^2$. The estimate as such, as well as the both portions are preferably squared figures, which avoid negative values for the estimate. The matrices also preferably represent dispersions with respect to the first and second spatial dimensions. Although the uncertainty estimate is defined here as a sum of the first and second portion other combinations of the first and second portion are possible in order to determine the uncertainty estimate.

The first portion $\hat{U}_{VP}^2$ represents the uncertainty with respect to the first estimated coefficient $\tilde{c}_t$ and the second estimated coefficient $\tilde{s}_t$ of the velocity profile equation. Thus, the first portion can be interpreted to represent the uncertainty with respect to the velocity profile solution. This can be expressed as:

$$\hat{U}_{VP}^2 = \begin{bmatrix} \hat{U}_{c_t}^2 & \hat{U}_{c_t s_t}^2 \\ \hat{U}_{s_t c_t}^2 & \hat{U}_{s_t}^2 \end{bmatrix},$$

wherein $\hat{U}_{c_t}^2$ is the uncertainty estimate of the first estimated coefficient, $\hat{U}_{s_t}^2$ is the uncertainty estimate of the second estimated coefficient, and $\hat{U}_{c_t s_t}^2 = \hat{U}_{s_t c_t}^2$ the cross-uncertainty estimate between the first and second estimated coefficient. In this way, the first portion corresponds in general to a covariance matrix.

The first portion can be further defined as:

$$\hat{U}_{VP}^2 = \hat{\sigma}_{VP}^2 + \overline{Bias}_{VP}^2,$$

with a covariance portion $\hat{\sigma}_{VP}^2$ representing a covariance matrix of the first estimated coefficient and the second estimated coefficient, and a bias portion $\overline{Bias}_{VP}^2$ representing a bias of the first estimated coefficient and the second estimated coefficient.

The covariance portion can be expressed as:

$$\hat{\sigma}_{VP}^2 = \begin{bmatrix} \hat{\sigma}_{c_t c_t} & \hat{\sigma}_{c_t s_t} \\ \hat{\sigma}_{s_t c_t} & \hat{\sigma}_{s_t s_t} \end{bmatrix},$$

wherein $\hat{\sigma}_{c_t c_t}$ is the variance estimate of the first estimated coefficient, $\hat{\sigma}_{s_t s_t}$ is the variance estimate of the second estimated coefficient, and $\hat{\sigma}_{c_t s_t} = \hat{\sigma}_{s_t c_t}$ is the covariance estimate of the first and second estimated coefficient.

As indicated before the covariance portion is preferable determined as:

$$\hat{\sigma}_{VP}^2 = \hat{\sigma}_r^2 (X^T X)^{-1}.$$

Having regard to the bias portion, a general definition can be given as:

$$\overline{Bias}_{VP}^2 = f(X, Y, k),$$

wherein Y represents the compensated range rate $\dot{r}_{cmp}$ and k represents some constants. Moreover, the matrix X is the same as before, namely:

$$X = \begin{bmatrix} \cos\theta_1 & \sin\theta_1 \\ \vdots & \vdots \\ \cos\theta_n & \sin\theta_n \end{bmatrix}.$$

In particular, the bias portion can be defined as:

$$\overline{Bias}_{VP}^2 = k_{ols\_bias\_scale} \hat{\sigma}_{VP}^2 + B,$$

with $$B = \begin{bmatrix} k_{c\_var\_bias} & 0 \\ 0 & k_{s\_var\_bias} \end{bmatrix},$$

wherein $k_{ols\_bias\_scale}$ is a scaling calibration parameter, $k_{c\_var\_bias}$ is an offset calibration parameter for the first estimated coefficient, and $k_{s\_var\_bias}$ is an offset calibration parameter for the second estimated coefficient.

It is noted that the bias portion $\overline{Bias}_{VP}^2$ is preferably a function of the covariance matrix $\hat{\sigma}_{VP}^2$ of the first and second estimated coefficient and additional calibration parameters.

Having regard to the second portion $\hat{U}_{V_{i,\omega}}^2$ of the uncertainty estimate the second portion can be defined as:

$$\hat{U}_{V_{i,\omega}}^2 = \begin{bmatrix} -y_{t,i} \\ x_{t,i} \end{bmatrix} [\hat{U}_\omega^2] [-y_{t,i} \quad x_{t,i}],$$

wherein $\hat{U}_\omega^2$ is the estimated uncertainty of the yaw rate.

In order to avoid a dynamic estimation of the uncertainty of the yaw rate, it is possible to rely on a predetermined uncertainty. This can be done under the assumption that yaw rate of objects is bounded. For example the yaw rate of typical traffic objects, e.g., vehicles usually may not exceed 30 degrees per second. It is then possible to model the yaw rate as a distribution (probability density function=pdf), for example a uniform distribution with zero mean and a maximum value $\omega_{t\_max}$ of the yaw rate $\omega_t$ as:

$$pdf(\omega_t) = \begin{cases} \dfrac{1}{2\omega_{t\_max}} & \text{for } \omega_t \in [-\omega_{t\_max}, \omega_{t\_max}] \\ 0 & \text{otherwise} \end{cases}.$$

The maximum value of the yaw rate (also called extremum) can be predetermined by a calibration parameter as:

$$\omega_{t\_max} = k_{max\_yaw\_rate}.$$

From standard mathematics the variance of the uniform pdf is:

$$\sigma_{\omega_t}^2 = \frac{\omega_{t\_max}^2}{3}.$$

The uncertainty of the yaw rate can then be set to the variance, this is:

$$U_{\omega_t}^2 = \sigma_{\omega_t}^2.$$

Therefore, the second portion of the uncertainty estimate is predetermined and expressed as:

$$U_{V_{i,\omega}}^2 = \begin{bmatrix} -y_{t,i} \\ x_{t,i} \end{bmatrix} [U_{\omega_t}^2][-y_{t,i} \quad x_{t,i}],$$

wherein it is understood that the second portion represents the uncertainty of the estimated velocity with respect to an angular velocity, the first coordinate $x_{t,i}$ in the second spatial dimension y and the second coordinate $y_{t,i}$ in the first spatial dimension x.

FIG. 6 gives an overview of some aspects of the method described above. Each of the boxes corresponds to an exemplary step of the method, wherein the step is indicated inside the box. Dashed boxes indicate that the corresponding step is merely optional.

The proposed uncertainty estimate has been evaluated in two different example scenarios. In order to quantify the validity of the uncertainty estimate the Normalized Estimation Error Squared (NEES) is used as a metric. This metric can be generally interpreted as a measure of consistency between the estimated velocity and an estimated variance or uncertainty estimate. A general definition can be given as:

$$e_i = (\dot{r}_{i,cmp} - \hat{\dot{r}}_{i,cmp})^T \hat{P}_i^{-1} (\dot{r}_{i,cmp} - \hat{\dot{r}}_{i,cmp}),$$

with $\hat{P}_i^{-1}$ representing the inverse of an estimated covariance matrix and $e_i$ representing the NEES for the i-th detection point. The covariance matrix $\hat{P}_i$ is either the estimated covariance matrix $\hat{\sigma}_{VP}^2$ or the proposed uncertainty estimate $\hat{U}_{V_{i,t}}^2$.

The estimated velocity and the estimated covariance matrix are consistent if the expected value of NEES is equal to the dimension n of the covariance matrix (here n=2):

$$H_0: E(e_i) = n.$$

In both example scenarios a simulation of a moving object has been carried out with 1000 Monte Carlo iterations. In the first scenario, a straight moving object was simulated. When using the estimated covariance matrix $\hat{\sigma}_{VP}^2$ the expected NEES is $E(e_i)=3.01$ which is inconsistent at the 95% significance level. When using the proposed uncertainty estimate $E(e_i)=2.03$ which is consistent at the 95% significance level.

In the second scenario a yawing object was simulated. When using the estimated covariance matrix $\hat{\sigma}_{VP}^2$ $E(e_i)=1663.4$ which is completely inconsistent. Using this as an "uncertainty estimate" would be dangerous for a tracking application. However, when using the proposed uncertainty estimate then $E(e_i)=2.04$ which is well consistent at the 95% significance level. Therefore, the proposed uncertainty estimate can be used, e.g., for safe tracking applications.

LIST OF REFERENCE SIGNS 1 origin of world coordinate system
2 target vehicle
3 front bumper
3' rear bumper
3" origin of vehicle coordinate system
4 host vehicle
5 origin of sensor coordinate system
5' radar system
6, 6' detection point
7 center of rotation of the target

We claim:
1. A method comprising:
determining an uncertainty estimate of an estimated velocity of an object, the uncertainty estimate representing an uncertainty of a dispersion of the estimated velocity with respect to a true velocity of the object, wherein determining the uncertainty estimate comprises:
determining a first portion of the uncertainty estimate, the first portion representing the uncertainty with respect to a dispersion of a first estimated coefficient and a second estimated coefficient of a velocity profile equation of the object, the first estimated coefficient being assigned to a first spatial dimension of the estimated velocity and the second estimated coefficient being assigned to a second spatial dimension of the estimated velocity, the velocity profile equation representing the estimated velocity in dependence of the first estimated coefficient and the second estimated coefficient;
determining a second portion of the uncertainty estimate based on a predetermined intermediate; second portion representing the uncertainty with respect only to a dispersion of an angular velocity of the object, a first coordinate of the object in the second spatial dimension, and a second coordinate of the object in the first spatial dimension; and
determining the uncertainty estimate based on the first portion and the second portion.
2. The method according to claim 1, wherein: the uncertainty estimate and one or more of the first portion and the second portion of the uncertainty estimate are determined as a two-dimensional matrix; and the two-dimensional matrix represents a dispersion with respect to the first spatial dimension and the second spatial dimension.
3. The method according to claim 1, wherein the first portion is determined based on:
a covariance portion representing a covariance matrix of the first estimated coefficient and the second estimated coefficient; and
one or more of a bias portion representing a bias of the first estimated coefficient and the second estimated coefficient.
4. The method according to claim 3, wherein:
the bias portion is determined based on a plurality of detection points of the object and at least one constant; and
each of the plurality of detection points comprises an estimated velocity assigned to a detection position on the object, the detection position on the object being represented at least by an angle.
5. The method according to claim 1, wherein:
the estimated velocity is assigned to a position of the object represented by the first coordinate of the object in the first spatial dimension and the second coordinate of the object in the second spatial dimension; and
the uncertainty estimate is determined in dependence of the position of the object.

6. The method according to claim 1, wherein the intermediate second portion is predetermined by a variance of a distribution of the angular velocity of the object.

7. The method according to claim 6, wherein the distribution is a uniform distribution with at least one predetermined extremum of the angular velocity of the object.

8. The method according to claim 1, wherein the intermediate second portion is predetermined by at least one parameter representing an extremum of the angular velocity of the object.

9. The method according to claim 1, wherein the uncertainty estimate is determined based on a sum of the first portion and the second portion.

10. The method according to claim 1, further comprising:
controlling a vehicle in a vicinity of the object in dependence of the estimated velocity of the object, wherein the estimated velocity is processed in dependence of the uncertainty estimate.

11. The method according to claim 1, further comprising:
tracking the object based on the uncertainty estimate;
classifying the object based on the uncertainty estimate; and
discriminating the object from other objects based on the uncertainty estimate.

12. A system comprising:
at least one processor configured to determine an uncertainty estimate of an estimated velocity of an object, the uncertainty estimate representing an uncertainty of a dispersion of the estimated velocity with respect to a true velocity of the object, wherein the processor is configured to determine the uncertainty estimate by:
determining a first portion of the uncertainty estimate, the first portion representing the uncertainty with respect to a dispersion of a first estimated coefficient and a second estimated coefficient of a velocity profile equation of the object, the first estimated coefficient being assigned to a first spatial dimension of the estimated velocity and the second estimated coefficient being assigned to a second spatial dimension of the estimated velocity, the velocity profile equation representing the estimated velocity in dependence of the first estimated coefficient and the second estimated coefficient;
determining a second portion of the uncertainty estimate based on a predetermined intermediate second portion representing the uncertainty with respect only to a dispersion of an angular velocity of the object, a first coordinate of the object in the second spatial dimension, and a second coordinate of the object in the first spatial dimension; and
determining the uncertainty estimate based on the first portion and the second portion.

13. The system according to claim 12, wherein:
the processor is configured to determine the uncertainty estimate and one or more of the first portion and the second portion of the uncertainty estimate as a two-dimensional matrix; and
the two-dimensional matrix represents a dispersion with respect to the first spatial dimension and the second spatial dimension.

14. The system according to claim 12, wherein the processor is configured to determine the first portion based on:
a covariance portion representing a covariance matrix of the first estimated coefficient and the second estimated coefficient; and
one or more of a bias portion representing a bias of the first estimated coefficient and the second estimated coefficient.

15. The system according to claim 14, wherein:
the processor is configured to determine the bias portion based on a plurality of detection points of the object and at least one constant; and
each of the plurality of detection points comprises an estimated velocity assigned to a detection position on the object, the detection position on the object being represented at least by an angle.

16. The system according to claim 12, wherein the processor is configured to:
assign the estimated velocity to a position of the object represented by the first coordinate of the object in the first spatial dimension and the second coordinate of the object in the second spatial dimension; and
determine the uncertainty estimate in dependence of the position of the object.

17. The system according to claim 12, wherein the processor is configured to:
predetermine the intermediate second portion by a variance of a distribution of the angular velocity of the object.

18. The system according to claim 17, wherein the distribution is a uniform distribution with at least one predetermined extremum of the angular velocity of the object.

19. The system according to claim 12, wherein the processor is configured to:
predetermine the intermediate second portion by at least one parameter representing an extremum of the angular velocity of the object.

20. The system according to claim 12, wherein the processor is configured to:
determine the uncertainty estimate based on a sum of the first portion and the second portion.

21. The system according to claim 12, wherein the processor is further configured to:
control a vehicle in a vicinity of the object in dependence of the estimated velocity of the object, wherein the estimated velocity is processed in dependence of the uncertainty estimate.

22. The system according to claim 12, wherein the processor is further configured to:
track the object based on the uncertainty estimate;
classify the object based on the uncertainty estimate; and
discriminate the object from other objects based on the uncertainty estimate.

* * * * *